US009573676B2

(12) United States Patent
Dyckrup et al.

(10) Patent No.: US 9,573,676 B2
(45) Date of Patent: Feb. 21, 2017

(54) DEVICE FOR AN ADJUSTABLE FLAP OF A WING (71) Applicant: Airbus Operations GmbH, Hamburg (DE)

(72) Inventors: Werner Dyckrup, Visbek (DE); Wilfried Ellmers, Achim (DE)

(73) Assignee: Airbus Operations GmbH, Hamburg (DE)

( * ) Notice: Subject to any disclaimer, the term of this patent is extended or adjusted under 35 U.S.C. 154(b) by 331 days.

(21) Appl. No.: 13/684,882

(22) Filed: Nov. 26, 2012

(65) Prior Publication Data

US 2013/0327887 A1 Dec. 12, 2013

Related U.S. Application Data (63) Continuation of application No. PCT/EP2011/002609, filed on May 26, 2011.

(Continued)

(30) Foreign Application Priority Data

May 26, 2010 (DE) .................. 10 2010 021 576

(51) Int. Cl.
*B64C 13/28* (2006.01)
*B64C 9/02* (2006.01)
(Continued)

(52) U.S. Cl.
CPC ............ *B64C 13/28* (2013.01); *B64C 9/02* (2013.01); *B64C 9/16* (2013.01); *B64C 13/42* (2013.01);
(Continued)

(58) Field of Classification Search
CPC ........................................ B64C 9/02
See application file for complete search history.

(56) References Cited

U.S. PATENT DOCUMENTS

| 2,471,857 A | 5/1949 | Bleakney et al. |
| 4,530,271 A | 7/1985 | Cronin |

(Continued)

FOREIGN PATENT DOCUMENTS

| CN | 101484355 | 7/2009 |
| GB | 489618 | 7/1938 |

(Continued)

OTHER PUBLICATIONS

German Office Action for Application No. 10 2010 021 576.7 dated Nov. 13, 2013.

(Continued)

*Primary Examiner* — Brian M O'Hara
*Assistant Examiner* — Michael Kreiner
(74) *Attorney, Agent, or Firm* — Jenkins, Wilson, Taylor & Hunt, P.A.

(57) ABSTRACT

The invention concerns a device for a adjustable flap adjustably mounted on a main wing surface of an aeroplane wing, in particular, a landing flap, with at least one adjustment unit for purposes of adjustment of the adjustable flap, which has an actuator arranged, or that can be arranged, on the main wing surface, and has a kinematic adjustment mechanism running between the actuator and the adjustable flap, wherein the adjustable flap is mechanically coupled with the actuator via the kinematic adjustment mechanism. At least one damping unit for purposes of damping a dynamic loading effected by the adjustable flap on the adjustment unit, which can occur as a result of a critical malfunction event occurring in the region of the adjustable flap, is arranged, or can be arranged, between the main wing surface and the adjustable flap.

13 Claims, 7 Drawing Sheets

Related U.S. Application Data (60) Provisional application No. 61/348,373, filed on May 26, 2010.

(51) Int. Cl.
  *B64C 9/16* (2006.01)
  *B64C 13/42* (2006.01)
  *B64D 45/00* (2006.01)

(52) U.S. Cl.
  CPC .......... *B64D 2045/001* (2013.01); *Y02T 50/44* (2013.01)

(56) References Cited

U.S. PATENT DOCUMENTS

| | | | |
|---|---|---|---|
| 5,203,524 A * | 4/1993 | Laceby et al. | 244/99.13 |
| 6,241,182 B1 * | 6/2001 | Durandeau | B64C 13/42 244/227 |
| 7,165,746 B2 * | 1/2007 | Audren | 244/75.1 |
| 7,397,209 B2 * | 7/2008 | Hirai | 318/280 |
| 7,510,150 B2 * | 3/2009 | Williams et al. | 244/211 |
| 7,837,144 B2 * | 11/2010 | Kothera et al. | 244/99.2 |
| 8,172,174 B2 * | 5/2012 | Hejda | 244/99.2 |
| 8,567,715 B2 * | 10/2013 | Fervel et al. | 244/99.4 |
| 2009/0146016 A1 * | 6/2009 | Kordel et al. | 244/215 |
| 2009/0302516 A1 * | 12/2009 | Steele | 267/140.15 |
| 2010/0100355 A1 * | 4/2010 | Marx et al. | 702/183 |

FOREIGN PATENT DOCUMENTS

| | | | |
|---|---|---|---|
| WO | WO 2008/001336 | 1/2008 | |
| WO | WO 2009020452 A1 * | 2/2009 | B64C 9/02 |
| WO | WO 2011/147571 | 12/2011 | |

OTHER PUBLICATIONS

Chinese Office Action for Application No. 201180037436.2 dated Sep. 22, 2014.

International Search Report for Application No. PCT/EP2011/002609 dated Dec. 2, 2011.

* cited by examiner

DEVICE FOR AN ADJUSTABLE FLAP OF A WING

CROSS-REFERENCE TO RELATED APPLICATIONS

This application is a continuation of and claims priority to PCT/EP2011/002609 filed May 26, 2011 which claims the benefit of and priority to U.S. Provisional Application No. 61/348,373, filed May 26, 2010 and German Patent Application No. 10 2010 021 576.7 filed May 26, 2010, the entire disclosures of which are herein incorporated by reference.

TECHNICAL FIELD

The invention concerns a device for a adjustable flap adjustably mounted on a main wing surface of a wing, in particular, a landing flap or a control flap of an aeroplane, with at least one adjustment unit for purposes of adjustment of the adjustable flap, which has an actuator arranged, or that can be arranged, on the main wing surface and a kinematic adjustment mechanism running between the actuator and the adjustable flap, wherein the adjustable flap is mechanically coupled with the actuator via the kinematic adjustment mechanism. The invention also concerns a method for the operation of a device in accordance with the invention.

BACKGROUND

Devices of this kind are of known art. In modern aeroplanes two devices of this kind are normally deployed for purposes of adjustment of a adjustable flap. Here the adjustment units of the two devices are spaced apart from one another in the wingspan direction, and their actuators are coupled with a central drive via a central torsion shaft train. The torsion shaft train transfers the mechanical drive power of the drive onto the actuators, which in turn actuate the adjustable flap via the kinematic adjustment mechanism.

In flight aerodynamic forces act on the adjustable flaps of a wing; in particular, these are dependent on the setting of the respective adjustable flap relative to the main wing surface, and on the flight speed. As a result of the aerodynamic forces acting on a adjustable flap a so-called flap moment is brought about, which acts on the adjustment units; the latter must apply a corresponding flap counter-moment so as to hold the adjustable flap in the desired setting. With the occurrence of a malfunction event, in particular a critical malfunction event that represents a hazard to safe flying operations, such as, for example, in the event of a fracture occurring in the kinematic adjustment mechanism of one of the adjustment units, it may be the case that one of the adjustment units can no longer apply the necessary flap counter-moment, so that the whole flap counter-moment must be applied by the other intact adjustment unit. This leads in particular to a sudden rise of the flap moment acting on the intact adjustment unit, so that the flap moment is not only statically redistributed onto the intact adjustment unit, but for a short period of time, in addition to the static loading, there is also a dynamic loading acting on the intact adjustment unit. The intact adjustment unit must be designed such that it can accommodate both the dynamic and static loadings acting on it. Since in particular the dynamic loading occurring for a short period of time can be relatively high, it is necessary to design the adjustment units to be very robust, which has a negative effect on the weight of the adjustment unit.

SUMMARY

The object of the present invention is to create an alternative design in which a weight saving can be achieved for the adjustment units.

The object is achieved by means of a device in accordance with Claim 1, and in particular in that, in a device of the kind cited in the introduction, at least one damping unit, for purposes of damping a dynamic loading effected by the adjustable flap (regulating flap) onto the adjustment unit, which in particular is brought about as a result of a critical malfunction event occurring in the region of the adjustable flap, is arranged, or can be arranged, between the main wing surface and the adjustable flap.

By means of the damping unit the dynamic loading, which in particular acts on the adjustment unit in the event of a malfunction, can be reduced. The adjustment unit can therefore be of a weaker design, and accordingly a weight reduction can be achieved for the adjustment unit, which more than compensates for the additional weight of the damping unit. A device can therefore be implemented in accordance with the invention that has a lesser weight compared with conventional devices of this kind, but nevertheless fulfils all requirements for safe flight operations.

The damping unit is preferably designed and arranged relative to the adjustment unit such that it reduces a dynamic loading exerted by the adjustable flap, which is brought about as a result of a fracture in the kinematic adjustment mechanism of the adjustment unit. Thus only a low dynamic loading, or in the most favourable case no dynamic loading at all, has to be accommodated by a further adjustment unit that is likewise coupled with the adjustable flap, as a result of which the risk of a fracture occurring in this adjustment unit can be reduced.

In accordance with one configuration of the invention the damping unit is embodied as a component that is separate from the kinematic adjustment mechanism and arranged outboard of the kinematic adjustment mechanism. By this means the damping unit can be maintained and also replaced when necessary, independently of the adjustment unit in a simple and cost-effective manner. A visual inspection of the damping unit is also promoted by this configuration. In addition the damping unit can be arranged independently of the adjustment unit at a suitable location between the adjustable flap and the main wing surface so as to achieve optimal damping of the dynamic loading.

In particular the damping unit is embodied as a rod-shaped design of component, as a result of which the damping unit can be manufactured particularly cost-effectively.

The damping unit is preferably articulated on both the main wing surface and also the adjustable flap; this promotes an adjustment of the adjustable flap by the adjustment unit. Here the damping unit preferably extends between the main wing surface and the adjustable flap transverse to the wingspan direction so as to have little air resistance, and is therefore only subjected to low aerodynamic forces in flight. In addition this arrangement promotes the damping action of the damping unit, since the flap moment, and with it also the dynamic loading occurring in the event of a redistribution of the flap moment, act in particular transverse to the wingspan direction.

The damping unit is preferably arranged at about the same wingspan location of the adjustment unit, as viewed in the wingspan direction. By this, the dynamic distribution exerted by the adjustable flap in the event of a fracture occurring in the adjustment unit can be damped out particularly effectively.

The damping unit can also be designed and arranged between the adjustable flap and the main wing surface such that it reduces the dynamic loading exerted by the adjustable flap acting on the adjustment unit that is brought about as a result of a fracture in a further adjustment unit, which is arranged spaced apart from the first adjustment unit in the wingspan direction, and is likewise provided for purposes of adjustment of the adjustable flap. In this case the damping unit thus serves primarily for the purpose of damping a dynamic loading acting on the first adjustment unit, which occurs as a result of a fracture or another critical malfunction event in the region of the further adjustment unit.

Here it is advantageous if the damping unit is integrated into the adjustment unit, in particular into the kinematic adjustment mechanism. In this manner the weight of the damping unit can be kept low, and overall a particularly large weight reduction can be achieved compared with a conventional device. Moreover no additional space, or only a small amount of additional space, is required for the damping unit in the region between the adjustable flap and the main wing surface.

The kinematic adjustment mechanism preferably has a drive rod, one end of which is articulated on the actuator, and the other end of which is articulated on the adjustable flap. Here the damping unit is integrated into the drive rod. In particular the damping unit forms a section of the drive rod lying between the preferably rigid ends of the drive rod. In this manner the damping unit can be integrated particularly easily into the kinematic adjustment mechanism.

The damping unit can be designed and arranged such that this effects no damping, or only a small amount of damping, on any adjustment of the adjustable flap provided by the adjustment unit under normal flight conditions. The damping unit can thus be regarded as a damper that is carried with and concomitant with the kinematic adjustment mechanism, and behaves in a passive manner under normal flight conditions; in particular it does not require any performance adjustment of the drive for the adjustment unit, or similar.

In accordance with a preferred configuration of the invention the damping unit has a breaking strength that exceeds the breaking strength of the kinematic adjustment mechanism, in particular by a factor of two, preferably by a factor of five, particularly preferably by at least an order of magnitude. In this manner the possibility of a fracture of the damping unit can be excluded with a very high probability. It is true that a damping unit design of this kind leads to a higher weight for the damping unit. The increase in weight can, however, always be maintained significantly below the additional weight that would be added if the adjustment unit itself were to be implemented with a comparably high breaking strength. Therefore a device in accordance with the invention can always be implemented with a relatively low weight, while at the same time satisfying the necessary safety requirements.

The damping unit can be designed as a mechanical oscillation damper. By this means the costs can be kept low. By means of the mechanical shock absorber the dynamic loadings occurring on the adjustment units, as a result of the redistribution of the flap moment in the event of a malfunction, which in particular occur in the form of oscillations of the adjustable flap, are rapidly absorbed and can thus decay rapidly.

The damping unit can also be designed as a hydraulic oscillation damper, by means of which once again a particularly cost-effective, and also lightweight damper can be implemented. A hydraulic oscillation damper of this kind can essentially be constructed in the same manner as a motor vehicle hydraulic shock absorber of known art, and can have a cylinder filled with hydraulic fluid, in which is arranged a piston with a piston rod that can move backwards and forwards, wherein one end of the oscillation damper, located on the cylinder, is articulated on the main wing surface, and the other end, located on the piston rod, is articulated on the adjustable flap.

In particular the hydraulic damper can have a pull-and-push stroke with a damping characteristic that effects rapid damping of the relatively rapid oscillations of the adjustable flap occurring as a consequence of a dynamic loading, but which has more or less zero influence on an adjustment of the adjustable flap provided under normal flight conditions. By this means a concomitant passive damper can be implemented in a particularly favourable and simple manner; under normal flight conditions it effects no damping of the adjustment movements of the landing flap, but can damp out any suddenly occurring dynamic loading exerted by the adjustable flap onto the adjustment units.

In accordance with one form of embodiment of the invention the damping characteristic of the damping unit is adjustable and the damping unit can be operated in a so-called normal operating mode, in which the damping unit has a damping characteristic provided for the malfunction event so as to achieve damping of the dynamic loading effected by the adjustable flap. In addition the damping unit can be operated in a fixed operating mode, in which it is fixed in position; in other words, it is not sprung, but instead forms a rigid configuration. In this manner after the occurrence of a malfunction event the static loading exerted by the adjustable flap onto the adjustment unit can be transferred, at least partially, onto the damping unit, and thus the adjustment unit can be further offloaded, as a result of which the risk of an occurrence of a further malfunction event can be reduced.

To fix the damping unit in position, for example an actuable mechanical locking device can be arranged on the damping unit; by means of this device the damping unit can be fixed in position.

The damping unit can also be operated in a free-running operating mode, in which no damping, or only a little damping, is achieved. The damping unit forms a so-called concomitant damper, which in the free-running operating mode has no influence on an adjustment of the adjustable flap provided under normal flight conditions.

A control unit is preferably provided to control the damping unit, by means of which the damping unit can selectively be operated in each of the operating modes. The control unit can in particular be coupled with a control system for the aeroplane and/or a control system for the adjustable flaps, or can be a part of at least one of these control systems, so that the damping unit can in particular be automatically controlled by the aeroplane control system and/or the adjustable flaps control system.

The control unit and the above-mentioned controllable damping unit are therefore designed in a comparable manner to the motor vehicle adaptive damping systems of known art, in which, according to the conditions the dampers can be switched between different characteristics matched to the conditions. In particular with an active controllable damping unit not only can damping of a suddenly occurring movement of the adjustable flap be achieved, but also, by fixing the damping unit in position—either by an alteration of the damping characteristic or by use of a locking device—a redistribution of load from the adjustment units onto the damping unit can be achieved, as a result of which the hazard of a malfunction event occurring in the adjustment units can be reduced.

In accordance with a further preferred configuration of the embodiment a malfunction event detection unit coupled with the control unit is provided, which comprises at least one sensor, in particular a position sensor and/or a load sensor, which is arranged on the adjustable flap, or in the vicinity of the adjustable flap, in particular on the main wing surface, or on one of the adjustment units for the adjustable flap. Here the malfunction event detection unit is designed for the purpose of detecting, in particular instantaneously, a malfunction event on the adjustable flap, with the aid of the sensor signals obtained from the at least one sensor.

The invention also concerns a regulating system of an aeroplane with a adjustable flap and two devices in accordance with the invention, each of which has an adjustment unit for purposes of adjustment of a adjustable flap.

The invention also concerns a high lift system with a regulating system as specified in the above paragraph, a control unit for the control of the at least one damping unit of the regulating system, an aeroplane control system and/or a adjustable flap control system, which is coupled with the control unit, and a malfunction event detection unit coupled with the aeroplane control system and/or a adjustable flap control system for the detection of a malfunction event associated with the adjustable flaps.

In addition the invention concerns a method for the operation of a device in accordance with the invention, in which the damping unit is operated in the normal operating mode and the adjustable flap is monitored, and, in which, after the detection of a malfunction event, the damping unit is operated in the fixed operating mode, so that after the occurrence of a critical malfunction event the static loading exerted by the adjustable flap onto the adjustment unit is at least partially to be transferred onto the damping unit. However, for the period of time during which the adjustable flap is adjusted, the damping unit is operated in the normal operating mode, or in the free-running operating mode.

Alternatively in accordance with another configuration of the method in accordance with the invention, monitoring of the adjustable flap takes place while the damping unit is operated in the free-running operating mode. In the event of detection of a malfunction event, however, the operating mode of the damping unit is altered, in particular instantaneously, into the normal operating mode, so as to reduce any dynamic loading onto the adjustment unit that may occur.

BRIEF DESCRIPTION OF THE DRAWINGS

In what follows the invention is elucidated in an exemplary manner with the aid of the accompanying drawings. In the figures in a schematic representation.

DETAILED DESCRIPTION

Figure 1:
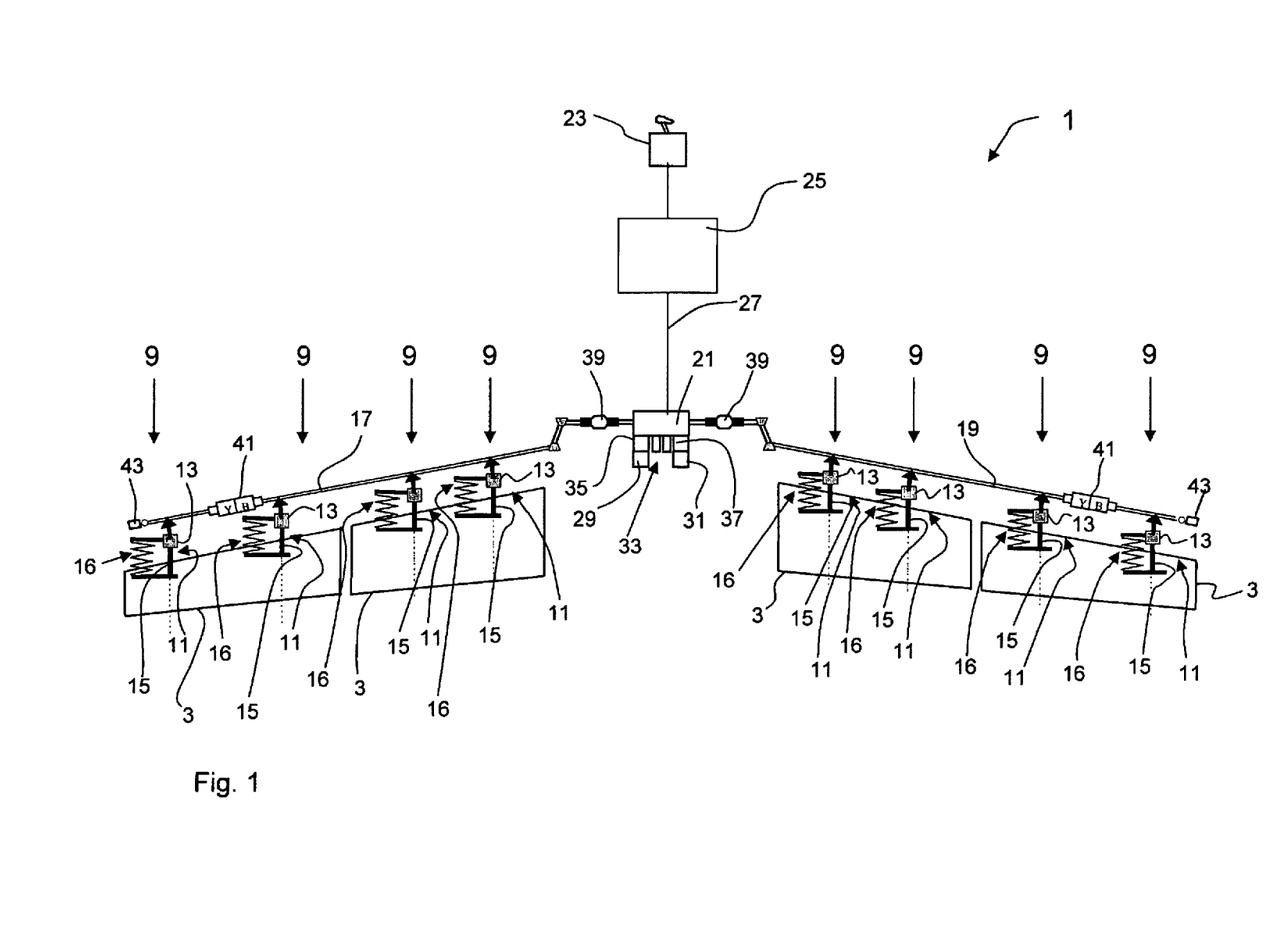
FIG. 1 shows a high lift system with adjustable flaps and devices coupled with the former in accordance with the invention.
Figure 3:
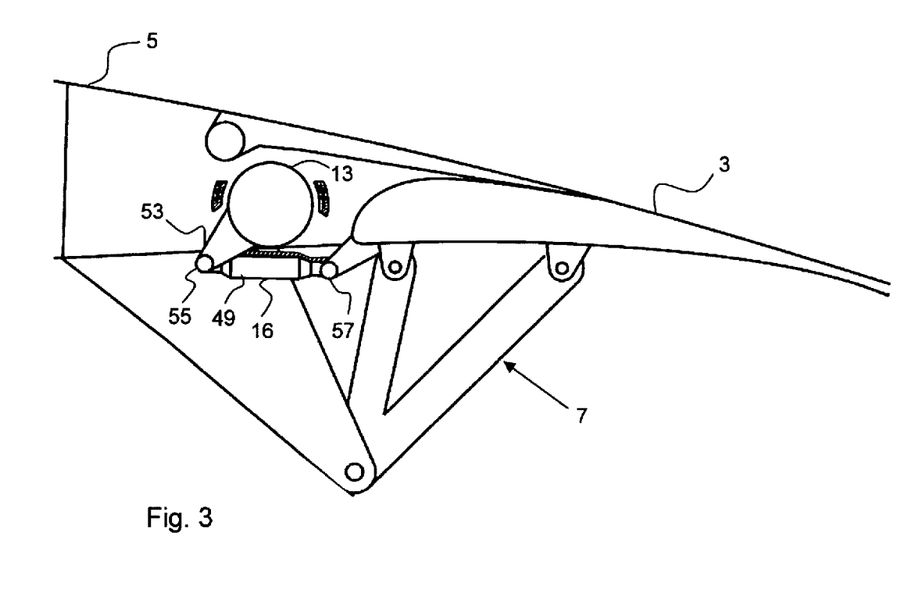
FIG. 3 shows a side view of the high lift system from FIG. 2, in which a device in accordance with the invention is arranged between the adjustable flap and the main wing surface.
Figure 4:
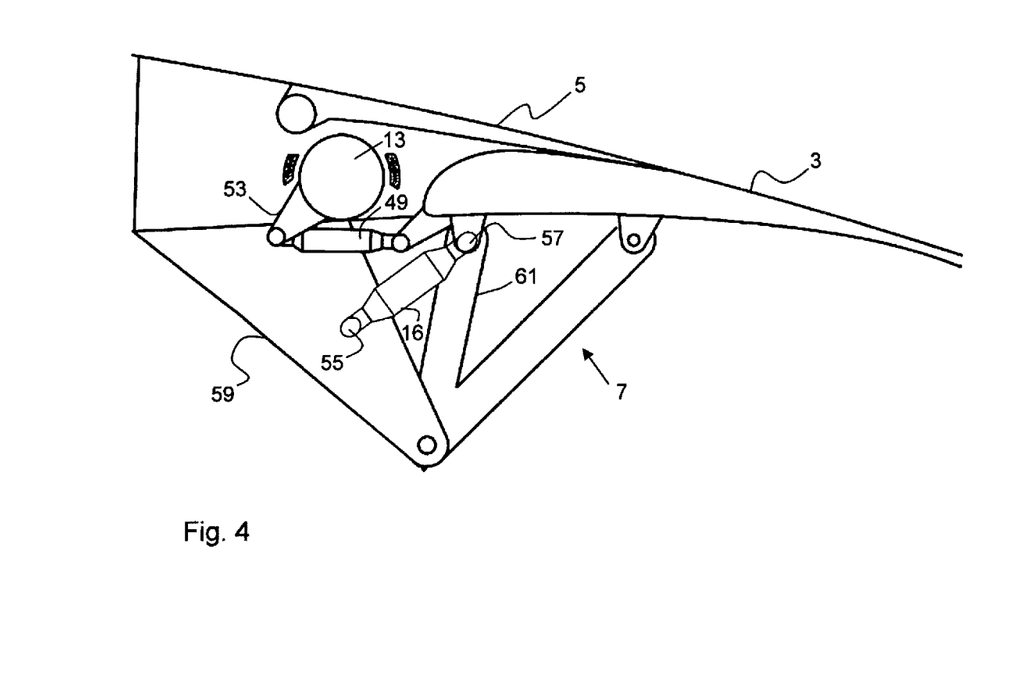
FIG. 4 shows a side view of the high lift system from FIG. 2, in which another variant of the device in accordance with the invention is arranged between the adjustable flap and the main wing surface.
Figure 5:
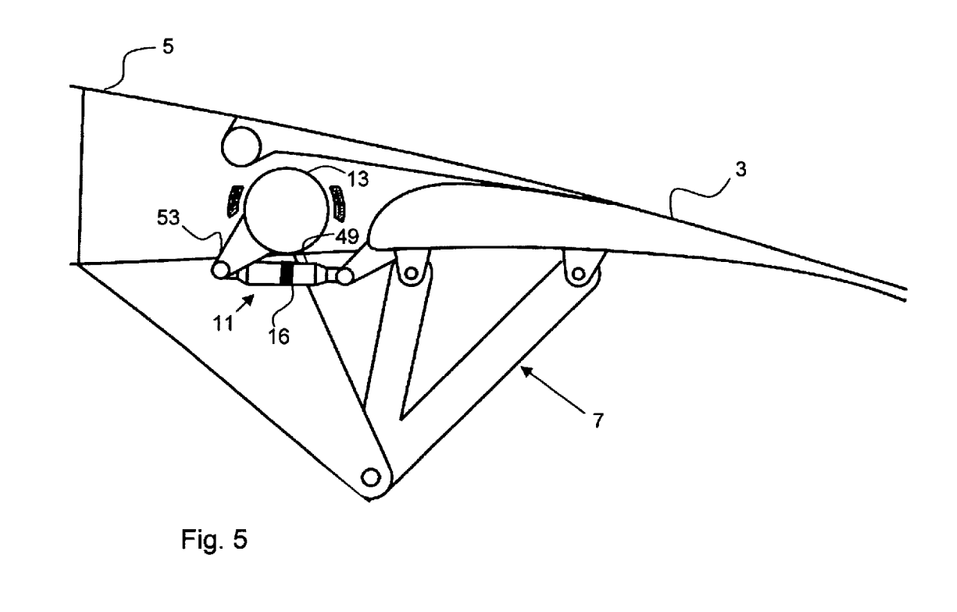
FIG. 5 shows a side view of the high lift system from FIG. 2, in which a further variant of the device in accordance with the invention is arranged between the adjustable flap and the main wing surface.

The high lift system 1 shown in FIG. 1 has two adjustable flaps, and e.g. two high lift flaps in the form of landing flaps 3, on each wing; these are adjustably mounted on the main wing surface 5, not represented in FIG. 1, of the respective wing by means of a mounting station 7 in each case (cf. FIGS. 3 to 5). Here the mounting station 7, known per se, can for example be designed in the form of a "dropped hinge kinematic mechanism" or a "Fowler kinematic mechanism".

Figure 2:
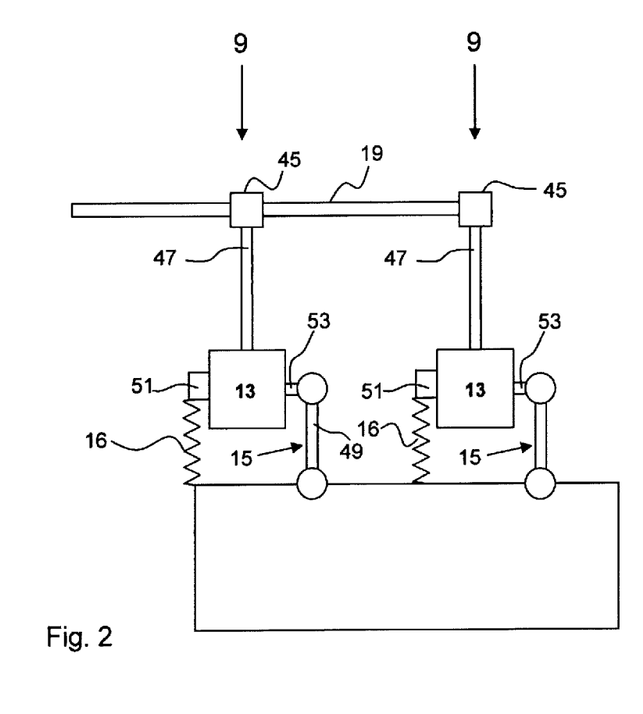
FIG. 2 shows an enlarged representation of part of the high lift system from FIG. 1, which is provided for the inner adjustable flap of the right-hand wing as viewed in the longitudinal axis of the aeroplane.

Each landing flap 3 is coupled with two devices 9 in accordance with the invention, each of which has an adjustment unit 11 for purposes of adjustment of the respective landing flap 3. Each adjustment unit 11 comprises an actuator 13 and a kinematic adjustment mechanism 15, which mechanically couples the actuator 13 attached to the main wing surface 5 with the adjustable flap 3 so that a movement of the actuator 13 can be transferred via the kinematic adjustment mechanism 15 to the landing flap 3. Each device 9 has, in addition, a damping unit 16, which, in accordance with the variant represented in FIGS. 1 to 3, is arranged in parallel with the kinematic adjustment mechanism 15 between the respective landing flap 3 and the main wing surface 5, in other words it is articulated on the actuator 13 and on the landing flap 3 in the same manner as the kinematic adjustment mechanism 15.

Each actuator 13 on the left-hand wing is mechanically coupled with a left-hand side rotary drive shaft 17, and each actuator 13 on the right-hand wing is mechanically coupled with a right-hand side rotary drive shaft 19. The rotary drive shafts 17, 19, are in turn mechanically coupled with a central drive 21, located for example in the aeroplane fuselage, by means of which the two rotary drive shafts 17, 19 can be driven synchronously.

The high lift system 1 is actuated and controlled via an interface, which in particular comprises a means of actuation 23, such as for example an actuation lever, or a control column, or similar, for purposes of generating input commands for the control of the aeroplane, or the setting of a high lift system with the high lift flaps. The means of actuation 23 is functionally coupled with a control and monitoring unit 25, which on the basis of the input commands transmits regulating commands via a cable 27 for purposes of activating the drive 21. The control and monitoring unit 25 is designed as per FIG. 1 as a so-called "central" control and monitoring unit and has—as is described in more detail below—control and monitoring functions for all the landing flaps. In particular with the aid of suitable input commands the control and monitoring unit 25 controls the drive 21 as necessary, such that the latter sets the rotary drive shafts 17, 19 in rotation, as a result of which the actuators 13 are moved and the landing flaps 3 that are coupled with them are adjusted in the desired manner.

In the interests of completeness it should be mentioned that in the example described the drive 21 has an hydraulic motor 29 and an electrical drive 31, which, by means of a differential 33 acting as a summation gearbox, are coupled with the rotary drive shafts 17, 19. In addition, two brakes 35, 37 are provided, which are functionally connected with the control and monitoring unit 25, and via which the control and monitoring unit 25 can lock the rotary drive shafts 17, 19 as necessary. In addition, a load or torque limiter 39 is integrated into each rotary drive shaft 17, 19 so as to avoid any overloading of the drive shafts 17, 19. A wing tip region brake 41 is also arranged on each rotary drive shaft 17, 19; this is functionally connected with the control and monitoring unit 25 and via this brake the rotary drive shafts 17, 19 can be locked as necessary. In addition asymmetry sensors 43 are located at the ends of the rotary drive shafts 17, 19; these are likewise functionally connected with the control and monitoring unit 25 and transfer measured data, with the aid of which the control and monitoring unit 25 can monitor the rotary movements of the drive shafts 17, 19.

As stated, the form of embodiment of the high lift system 1 represented in FIG. 2 shows the detail of the same that is coupled with the inner landing flap 3 on the right-hand wing. The following deliberations relate to this part of the high lift system, but also apply correspondingly with regard to the other adjustable flaps. As can be seen from FIG. 2, each actuator 13 is connected with the rotary drive shaft 19 by means of a step-up gearbox 45 and a rod 47 arranged between the step-up gearbox 45 and the actuator 13, so that the actuator 13 can convert a rotary movement of the drive shaft 19 into an adjustment movement for the adjustable flap 3. Here the actuator 13 is mechanically connected via a drive rod 49 of the kinematic adjustment mechanism 15 with the adjustable flap 3, wherein the drive rod 49 is articulated both on the actuator 13 and also on the adjustable flap 3. In addition a position sensor 51 is arranged on each actuator 13. The sensors 51 are functionally coupled with the control and monitoring unit 25. With the aid of the position signals received from the sensors 51 the unit 25 can monitor the current position of the adjustable flap 3.

The actuator is coupled via an actuator lever 53 with the respective adjustable flap. In accordance with FIG. 3 the actuator 13 is designed as a rotary actuator, which has an actuator lever 53, on the end of which is articulated one end 55 of the damping unit 16. The other end 57 of the damping unit 16 is, as represented, articulated on the landing flap 3. As is indicated in FIG. 3, the drive rod 49 runs in parallel with the damping unit 16, and is therefore articulated in a corresponding manner, also with one end on the actuator lever 53, and with the other end on the landing flap 3. For purposes of adjustment of the landing flap 3 the actuator 13 is driven such that with regard to FIG. 3 it rotates in the clockwise direction or counter-clockwise direction, as a result of which the landing flap 3, by virtue of the coupling via the drive rod 49, is pivoted relative to the main wing surface 5, and consequently is extended or retracted.

In flight aerodynamic forces act on the landing flap 3, as a result of which the landing flap 3 exerts a flap moment onto the adjustment units 11 of the two devices 9 coupled with the landing flap 3. The two adjustment units 11 must accommodate the flap moment so as to hold the landing flap 3 in the desired position. In these circumstances a critical malfunction event can occur in the region of the adjustment units 11. A malfunction event of this kind would be, for example, a fracture of the drive rod 49 of one of the two adjustment units 11 coupled with the landing flap 3. Then more or less instantaneously the whole flap moment must be accommodated by the intact adjustment unit 11, since the whole flap moment is redistributed onto the still intact adjustment unit 11. In these circumstances there is not only a static redistribution of the flap moment, but dynamic effects also occur. Thus a flap moment acts on the still intact adjustment unit, at least for a short period of time, that comprises both a static component and a dynamic component. This dynamic component effects at least in the short-term a dynamic loading on the still intact adjustment unit 11; this can be significantly larger than the static loading that is caused by the static component.

In accordance with the invention the damping units 16 are provided for purposes of damping the dynamic loading so as to attenuate such dynamic landings on the adjustment units 11. Here in the variant represented with regard to FIG. 3 the damping unit 16, arranged on the same actuator 13 in parallel with the broken drive rod 49, primarily damps out any dynamic loading resulting from the fracture, which the landing flap exerts on the other drive rod 49 that has remained intact.

As can also be discerned from FIG. 3, the damping units 16 move concomitantly during the adjustment of the landing flaps 3, and thus do not interfere with the adjustment procedure for the landing flaps 3. Since the damping units 16, as described, are arranged in each case parallel to the drive rods 49, but are preferably located outboard of the drive rods 49, the damping units can easily be maintained and replaced independently of the adjustment unit 11. Since each damping unit 16, however, as viewed in the wingspan direction, is arranged at about the same wingspan location as an adjustment unit 11, each damping unit 16 effects particularly good damping in the event of a failure of the parallel drive rod 49.

The above deliberations also apply correspondingly for the variant as per FIG. 4. However, in FIG. 4 the damping unit 16 is not arranged between the actuator lever 53 and the adjustable flap 3. Instead the one end 55 of the damping unit 16 is articulated on one attachment strut 59 for the mounting station 7, and the other end 57 of the damping unit 16 is articulated on a linkage strut 61 of the mounting station 7, wherein as can be seen from FIG. 4 the linkage strut 61 is articulated on the attachment strut 59.

As has already been described in detail above with regard to FIG. 3, the damping units 16 coupled with the adjustable flap 3 serve to provide damping of any dynamic loading occurring, in particular in the event of a malfunction, which dynamic loading is effected by the adjustable flap 3 on at least one of the adjustment units 11 coupled with the adjustable flap 3. What is advantageous in the variant described with regard to FIG. 4 is that, in the event of a fracture of a drive rod 49, the damping unit 16, which as viewed in the wingspan direction, is arranged at about the same wingspan location of the non-fractured, intact drive 5 rod, also contributes to the damping of the dynamic loading on the intact drive rod 49, since it is articulated on other locations on the main wing surface 5 and the landing flap 3.

The above deliberations also apply correspondingly for the variant as per FIG. 5. However, in this particularly cost-effective and space-saving variant the damping unit 16 is integrated into the drive rod 49 of the adjustment unit 11 so as to achieve damping of any dynamic loading acting on the drive rod 49.

The described damping units 16 can in particular have a mechanical or hydraulic oscillation damper. In particular hydraulic shock absorbers can be deployed as the damping units 16; these generate effective damping of rapidly progressing, suddenly occurring oscillations of the adjustable flaps or high lift flaps 3, but have practically no effect on the much more slowly progressing adjustment procedures for the landing flaps 3 provided in the take-off and landing phases.

Figure 6:
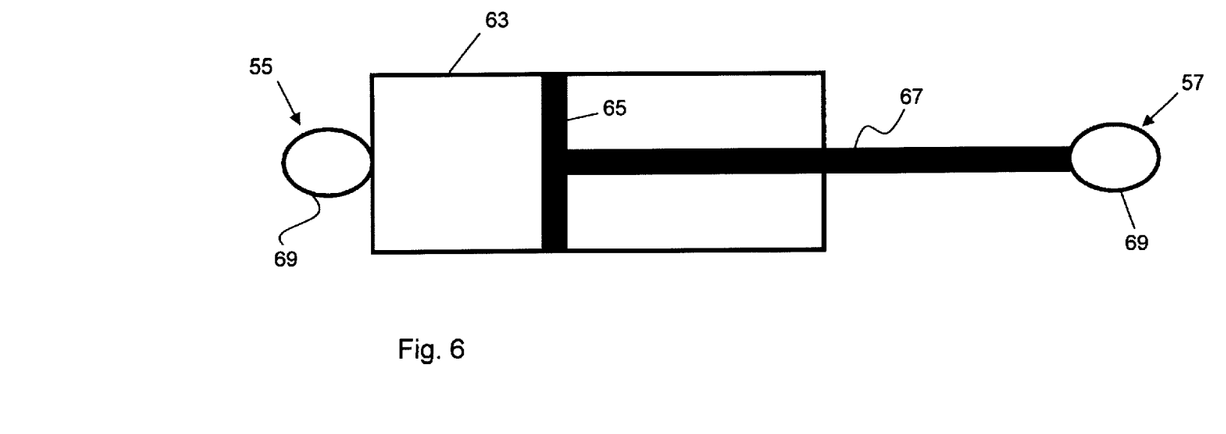
FIG. 6 shows a cross-sectional view of a damping unit.

The variant of a damping unit 16 shown in FIG. 6 is designed in the form of a hydraulic shock absorber that has a cylinder 63 filled with hydraulic fluid, in which a piston is arranged, with a piston rod 67 attached to the latter. In the event of an axial movement of the piston 65 and the piston rod 67 relative to the cylinder 63 the hydraulic fluid flows through narrow passages and/or valves (not shown) in the piston 65, as a result of which—as represented in a simplified manner—damping of the movement results. As represented, a ring 69 is attached at either end 55, 57 of the damping unit 16, so that the damping unit can be articulated both on the adjustable flap and the main wing surface.

Figure 7:
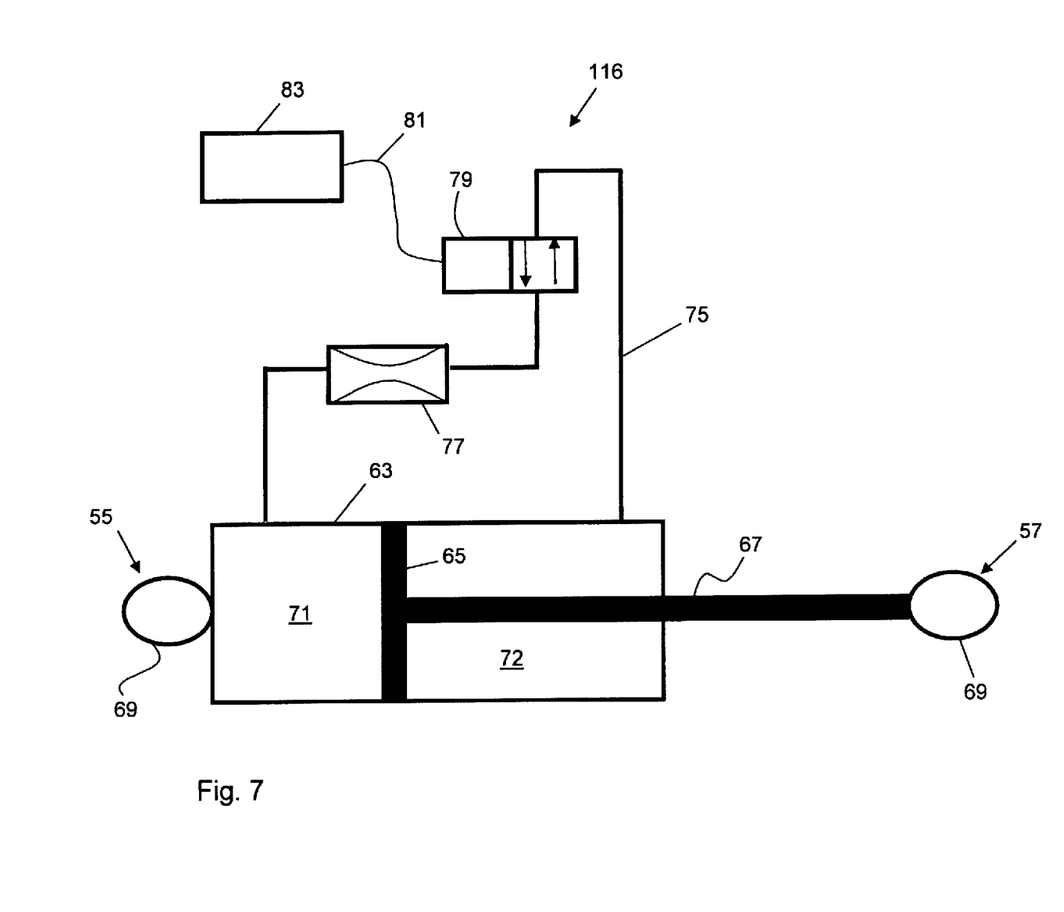
FIG. 7 shows a cross-sectional view of another variant of a damping unit.

The damping unit 116 as per FIG. 7 is in principle constructed in the same manner as the damping unit 16 represented in FIG. 6. However, in the hydraulic shock absorber as shown in FIG. 7 a hydraulic line 75 runs between a first lower hydraulic chamber 71 and a second or upper hydraulic chamber 72, separated from the lower chamber 71 by means of the piston 65, in which are arranged a throttle 77 for the hydraulic fluid and a controllable valve 79. The valve 79 is connected via an electric cable 81 with a control unit 83. By means of the control unit 83 the valve 79 can be controlled such that in a normal operating mode the damping unit 116 has the damping characteristic provided for the malfunction event. In addition, the damping unit 116 can be designed such that with a completely opened valve 79 (open valve state) the piston 65 can be moved essentially without damping in the axial direction in the cylinder 63, so that the damping unit 116 can be operated in a so-called free-running mode. Alternatively or additionally provision can be made that the valve 79 is closed by means of the control unit 83. By virtue of the low level of compressibility of the hydraulic fluid practically no movement of the piston 65 is any longer possible with a closed valve, so that after closure of the valve 79 the damping arrangement 116 is fixed in position. In this respect the damping unit 116 can also be operated in a fixed operating mode.

The control unit 83 can in turn be functionally connected with the control and monitoring unit 25, or designed as a part of the latter unit. As stated above, the control and monitoring unit 25 is functionally connected with sensors for determining the operating state of the adjustment unit of the adjustable flap and e.g. with a load sensor for determining the loads occurring in the adjustment unit, or with the position sensors 51, and has a fault detection function, which is embodied such that with the aid of the signals or data transmitted from the sensors and/or the position sensors 51, a malfunction event on the adjustment device and/or on the landing flap 3 can be detected with this function and assigned to the adjustment device and/or the landing flap 3. Furthermore, the control and monitoring unit 25 can have a reconfiguration function, with which, depending upon the fault state identified:

the valve 79 can be closed so as to operate the damping unit 116 in the free-running mode, or after closure of the valve 79 the damping arrangement 116 can be fixed in position so as to operate the damping unit 116 in the fixed operating mode.

The reconfiguration function can be embodied such that the free-running mode is activated if the fault detection function, via the sensor for determining the operating state of the adjustment unit of the adjustable flap, presumes a malfunction event on the adjustment unit or the adjustable flap, and assigns a fault state to the one or the other. The fault detection function can in particular be embodied such that this assigns a fault state to the respective adjustment unit, if it establishes that signals from the load sensor for determining the loads occurring in the adjustment unit are less than a predetermined normal operating value, or exceed a prescribed maximum operating value, and/or signals from a position sensor deviate from a design value. On the basis of the assignment of the fault state the reconfiguration function generates a command signal to the control device 83 to activate the free-running mode. This in turn then generates a corresponding command signal to the valve 79 to bring the latter into its open state.

Furthermore, the reconfiguration function can generate a command for purposes of controlling the valve 79, with which the latter can be brought into the closed state to produce the fixed operating mode. Here the reconfiguration function can be embodied such that it generates such a command with a timewise dependence on the command to switch the valve into the open valve state. In this case provision can in particular be made that the command to switch the valve 79 into the open valve state is generated at a predetermined period of time after switching the valve 79 into its open state. Alternatively or additionally the reconfiguration function can be embodied such that it generates the command to switch the valve 79 into the open valve state on the basis of the signal value from the at least one sensor for determining an operating state. This can be provided in particular for the case in which a signal value is generated by the respective sensor for determining a system state, which exceeds or falls below a limiting value, which deviates from the limiting value for the setting up of the free-running mode, and in particular is larger than the latter.

The control function 83 can be integrated in the control and monitoring unit 25, or can be left out, in particular, if it is part of a reconfiguration function that is integrated in the control and monitoring device 25. The control function 83 can also be designed as an independent and e.g. decentralised unit arranged on the respective adjustment device.

The control and monitoring unit 25 can be embodied as a "central" control and monitoring unit, preferably arranged centrally in the aeroplane fuselage, wherein the signals from the at least one sensor for determining an operating state of the adjustment unit are transmitted to the central control and monitoring device for purposes of an evaluation in which a comparison function is implemented to compare the sensor signals registered by the sensor with design values, and also an evaluation with an assignment of a fault state to the respective adjustment unit in the event of an appropriate deviation being present between the values that have been compared with one another. Furthermore, the fault detection function and the reconfiguration function can be implemented in the central control and monitoring device. Alternatively, the fault detection function and the reconfiguration function can be integrated in decentralised or local control and monitoring devices, which on the main wing surface and in the spanwise direction of the same are preferably assigned in each case to, and are preferably arranged locally in the spatial vicinity of, those adjustment devices of the same adjustable flap that the local control and monitoring device controls in each case. Here provision can be made that each local control and monitoring device has a fault detection function and reconfiguration function in accordance with the invention that operates with regard to the adjustment device, or adjustment devices, assigned in each case, of one or a plurality of adjustable flaps of a wing. The at least one sensor for determining an operating state can in particular be functionally coupled to the local control and monitoring device. In such an implementation the central control and monitoring device receives the commands to the adjustment units generated by the reconfiguration functions.

In general a monitoring function can be integrated into the central control and monitoring device; this receives the commands generated by the reconfiguration functions and registers the state of the adjustment devices for further safety functions of the overall aeroplane system, e.g. a cockpit display or the flight control system.

Damping units 116 as per FIG. 7 can be deployed instead of the damping units 16 described with regard to FIGS. 1 to 6. Here the damping units are operated under normal flight conditions by the control unit 83 in the above-stated normal operating mode, so that the damping units 116 have a damping characteristic provided for the malfunction event. After the control and monitoring unit 25 has established a malfunction event on a landing flap 3 and thus has assigned a fault state to an adjustment device, the damping units 116, which are articulated on the landing flap 3, can be switched into the fixed operating mode. By this means the damping units 116 accept at least a proportion of the flap moment exerted by the landing flap 3, so that the adjustment units 11 are offloaded.

Alternatively or additionally the damping units 116 under normal flight conditions can also be operated in the free-running operating mode, so that adjustment of the landing flaps 3 is possible without resistance of the damping units 116. Here the landing flaps 3 are permanently monitored by means of the sensors 51. In accordance with one form of embodiment of the invention the control and monitoring unit 25, on the basis of establishing a malfunction event and the corresponding assignment of a fault case to an adjustment device assigned to a adjustable flap 3, by means of the control unit 23 switches the damping units 116, which are connected with the adjustable flap 3 on which the malfunction event has been detected within a period of time of, e.g. the order of milliseconds, into the normal operating mode, so as to damp out any dynamic loading on the adjustment units 11 that may occur. After the detection of the malfunction event the damping units 116 can be switched back into the fixed operating mode, as has already been described above.

By the deployment of the actively controllable damping units 116 described with regard to FIG. 7 can therefore not only a reduction of suddenly occurring dynamic loadings on the adjustment units 11 be achieved, but after a detected malfunction event the flap moment effected by a adjustable flap 3 onto the adjustment units 11 can also be redistributed onto the damping units 116 coupled with the adjustable flap 3.

REFERENCE SYMBOL LIST

1 High lift system
 3 Landing flap
 5 Main wing surface
 7 Mounting station
 9 Device
 11 Adjustment unit
 13 Actuator
 15 Kinematic adjustment mechanism
 16 Damping unit
 17 Rotary drive shaft
 19 Rotary drive shaft
 21 Central drive
 23 Means of actuation
 25 Control and monitoring unit
 27 Cable
 29 Hydraulic motor
 31 Electrical drive
 33 Differential
 35 Brake
 37 Brake
 39 Torque limiter
 41 Wing tip region brake
 43 Asymmetry sensor
 45 Step-up gearbox
 49 Drive rod
 51 Position sensor
 53 Actuator lever
 55 Damping unit end
 57 Damping unit end
 59 Attachment strut
 61 Linkage strut
 63 Cylinder
 65 Piston
 67 Piston rod
 69 Ring
 71 Lower hydraulic chamber
 73 Upper hydraulic chamber
 75 Hydraulic line
 77 Throttle
 79 Valve
 81 Electrical cable
 83 Control unit
 116 Damping unit

The invention claimed is:

1. A device for an adjustable flap adjustably mounted on a main wing surface of an airplane wing, the device comprising:
   at least one adjustment unit configured to adjust the adjustable flap, wherein the at least one adjustment unit has an actuator arranged, on the main wing surface and a kinematic adjustment mechanism running between the actuator and the adjustable flap, wherein the adjustable flap is mechanically coupled with the actuator via the kinematic adjustment mechanism; and
   at least one damping unit configured to damp a dynamic loading effected by the adjustable flap on the adjustment unit due to a critical malfunction event occurring in a region of the adjustable flap, wherein the at least one damping unit is arranged between the main wing surface and the adjustable flap,
   wherein the at least one damping unit comprises a passive damper which comprises a damping characteristic configured to effect no substantial damping of an adjustment movement of the adjustable flap under normal flight conditions, but which damps out any suddenly occurring dynamic loading exerted by the adjustable flap onto the adjustment unit, and
   wherein the damping unit is located at substantially a same wingspan location as the adjustment unit with respect to a wingspan direction of the airplane wing.

2. The device in accordance with claim 1, wherein the damping unit is designed and arranged, relative to the adjustment unit, such that the damping unit damps out movement of the adjustable flap upon a fracture occurring in the kinematic adjustment mechanism.

3. The device in accordance with claim 1, wherein the damping unit is separate from the kinematic adjustment mechanism, arranged external to the kinematic adjustment mechanism, the kinematic adjustment mechanism being articulated both on the main wing surface and also on the adjustable flap, and extends transverse to the wingspan direction between the main wing surface and the adjustable flap.

4. The device in accordance with claim 1, wherein the damping unit is designed and arranged to reduce the dynamic loading occurring as a result of a fracture of a further adjustment unit which is spaced apart from the first adjustment unit in the wingspan direction and is configured to adjust the adjustable flap.

5. The device in accordance with claim 4, wherein the damping unit is integrated into the adjustment unit.

6. The device in accordance with claim 4, wherein the kinematic adjustment mechanism has a drive rod with one end articulated on the actuator and another end articulated on the adjustable flap, and wherein the damping unit is integrated into the drive rod to form a section of the drive rod between the ends of the drive rod which are preferably rigid.

7. The device in accordance with claim 1, wherein the kinematic adjustment mechanism comprises a drive rod and the damping unit has a breaking strength that exceeds a breaking strength of the drive rod.

8. The device in accordance with claim 1, wherein the damping unit is designed as a mechanical or hydraulic oscillation damper.

9. The device in accordance with claim 1, wherein the damping unit is further operable in a fixed operating mode, in which the damping unit is fixed, and/or in a free-running operating mode, in which the damping unit effects little or no damping.

10. The device in accordance with claim 9, wherein a control unit is configured to select an operating mode of the damping unit.

11. The device in accordance with claim 10, further comprising a malfunction event detection unit coupled with the control unit, the malfunction event detection unit comprising at least one sensor arranged on the adjustable flap, in a vicinity of the adjustable flap, or on the adjustment unit for the adjustable flap, wherein the malfunction event detection unit is configured for instantaneously detecting a malfunction event on the adjustment unit using sensor signals obtained from the sensor.

12. A method for operating a device in accordance with claim 11, the method comprising:
operating the damping unit in a normal operating mode, monitoring the adjustable flap, and
operating, after detection of a malfunction event, the damping unit in the fixed operating mode, wherein, for a period of time during which an adjustment of the adjustable flap takes place, the damping unit is operated in the normal operating mode or in the free-running operating mode.

13. A method for operating a device in accordance with claim 11, the method comprising:
operating the damping unit in the free-running operating mode and monitoring the adjustable flap before the malfunction event has occurred and
selecting a normal operating mode for the damping unit, upon detection of a malfunction.

* * * * *